United States Patent [19]
Chang et al.

[11] Patent Number: 6,106,594
[45] Date of Patent: Aug. 22, 2000

[54] METHOD FOR SEPARATING METHANE FROM NATURAL GAS USING BISGLYCOLURIL DERIVATIVES

[75] Inventors: Clarence D. Chang, Princeton, N.J.; Suzanne Elaine Schramm, Glen Mills; Clarence Edward Chase, Bensalem, both of Pa.

[73] Assignee: Mobil Oil Corporation, Fairfax, Va.

[21] Appl. No.: 09/235,527

[22] Filed: Jan. 22, 1999

[51] Int. Cl.[7] .......................... B01D 47/06; B01D 53/14
[52] U.S. Cl. ................................. 95/184; 95/237
[58] Field of Search ........................ 95/184, 237

[56] References Cited

U.S. PATENT DOCUMENTS

| | | | |
|---|---|---|---|
| 4,305,733 | 12/1981 | Scholz et al. | 95/237 |
| 4,370,156 | 1/1983 | Goddin, Jr. et al. | 95/184 |
| 4,526,594 | 7/1985 | Mehra | 95/237 |
| 5,071,454 | 12/1991 | Streitberger et al. | 95/237 |
| 6,004,380 | 10/1999 | Landreau et al. | 95/184 |

OTHER PUBLICATIONS

Kresge, C.T. et al., "Ordered Mesoporous Molecular Sieves Synthesized by a Liquid–crystal Template Mechanism", *Nature*, 1992, 359:712.

Branda, N. et al., "Encapsulation of Methane and Other Small Molecules in a Self–Assembling Superstructure", *Science*, 1994, 263:1267–1268.

Valdes, Carlos et al., "Structure and Selectivity of a Small Dimeric Encapsulating Assembly", *Chem Eur. J.*, 1996, 2:8:898–991.

Wyler, Rene et al., "A Synthetic Cavity Assembles Through Self–Complementary Hydrogen Bonds**", *Angew. Chem Int. Ed. Engl.*, 1993, 832:12:1699–1701.

*Primary Examiner*—Duane S. Smith

[57] ABSTRACT

The present invention provides a method for selectively recovering methane from a gas stream including carbon dioxide using a bisglycoluril derivative to selectively extract the methane.

8 Claims, 5 Drawing Sheets

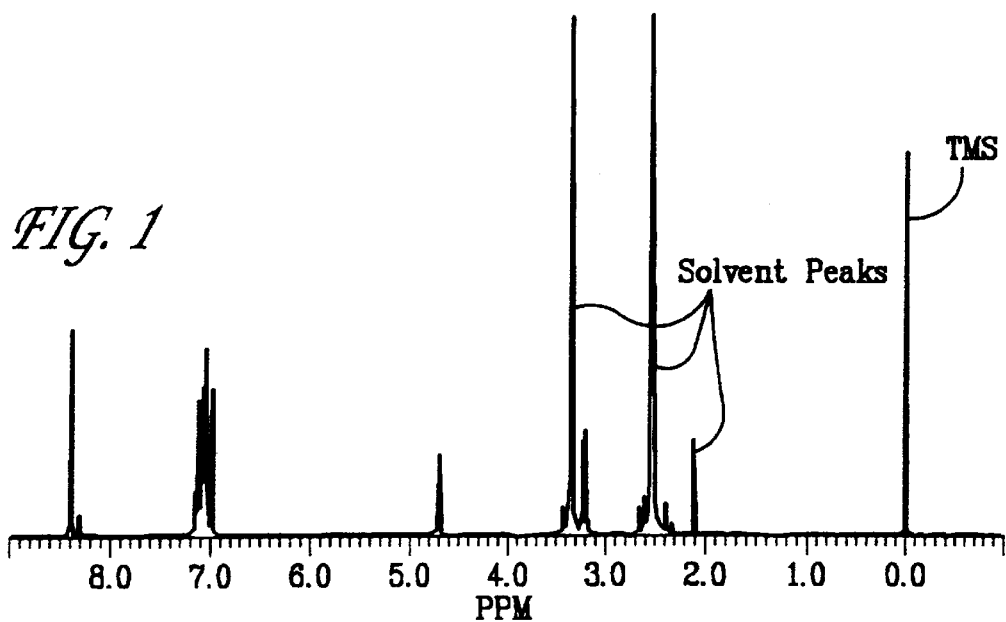
359.88 MHz ¹H NMR of bisdiphenylglycoluril solution
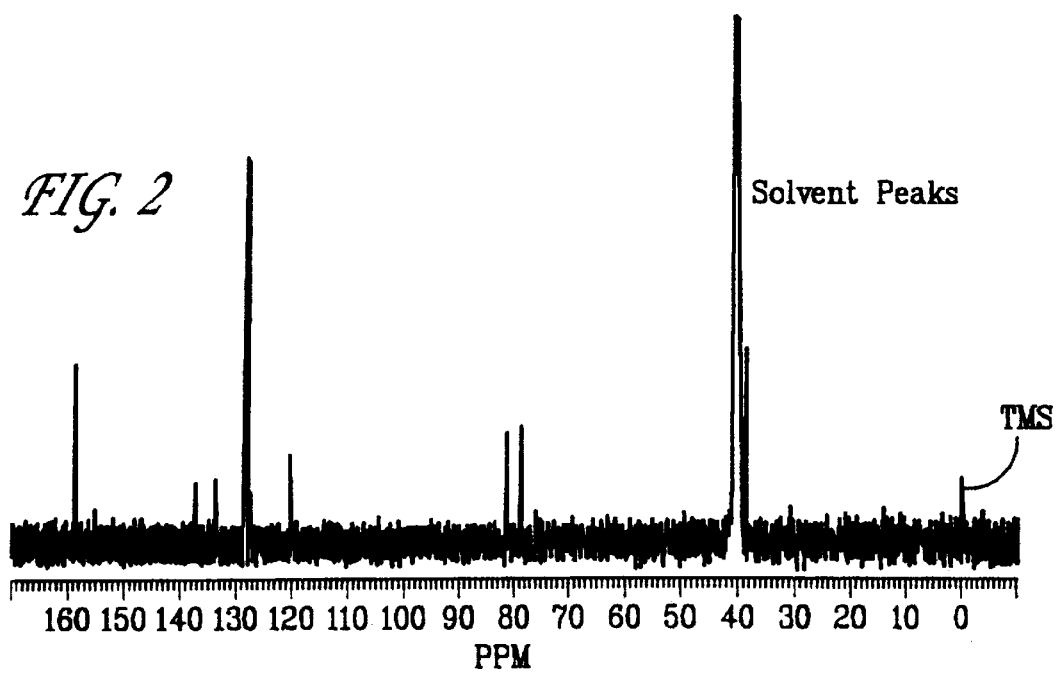
125.77 MHz ¹³C NMR of bisdiphenylglycoluril solution

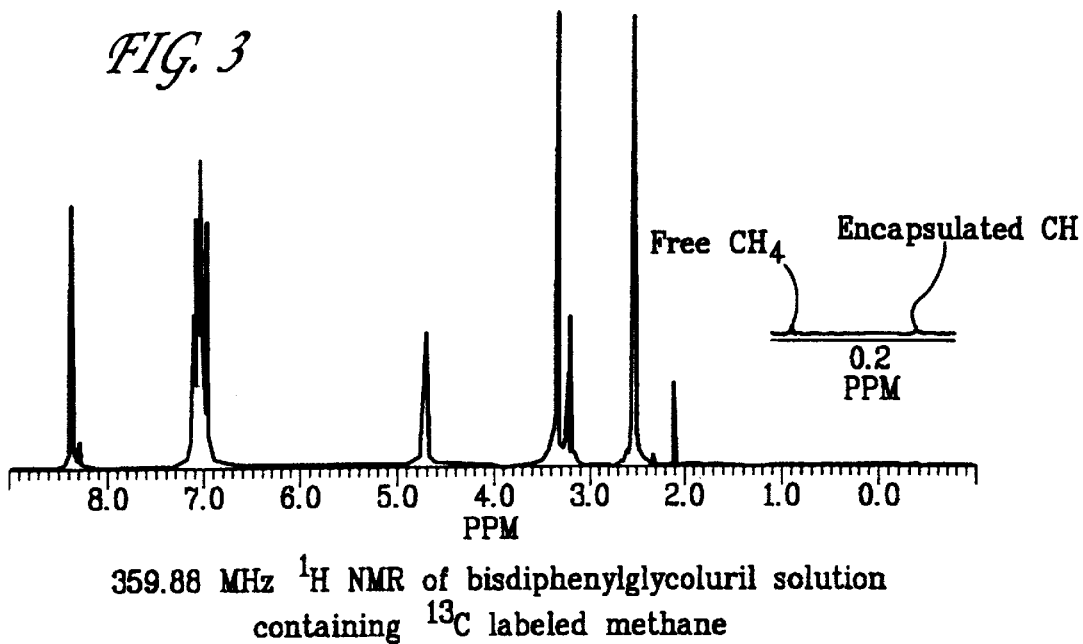
359.88 MHz $^1$H NMR of bisdiphenylglycoluril solution containing $^{13}$C labeled methane
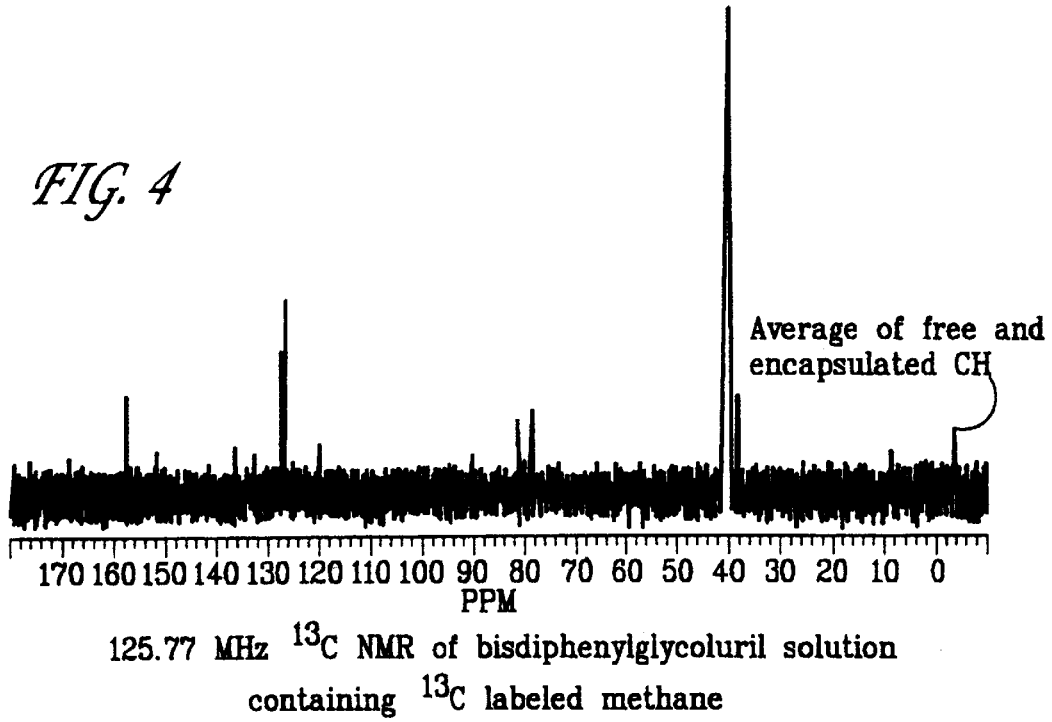
125.77 MHz $^{13}$C NMR of bisdiphenylglycoluril solution containing $^{13}$C labeled methane

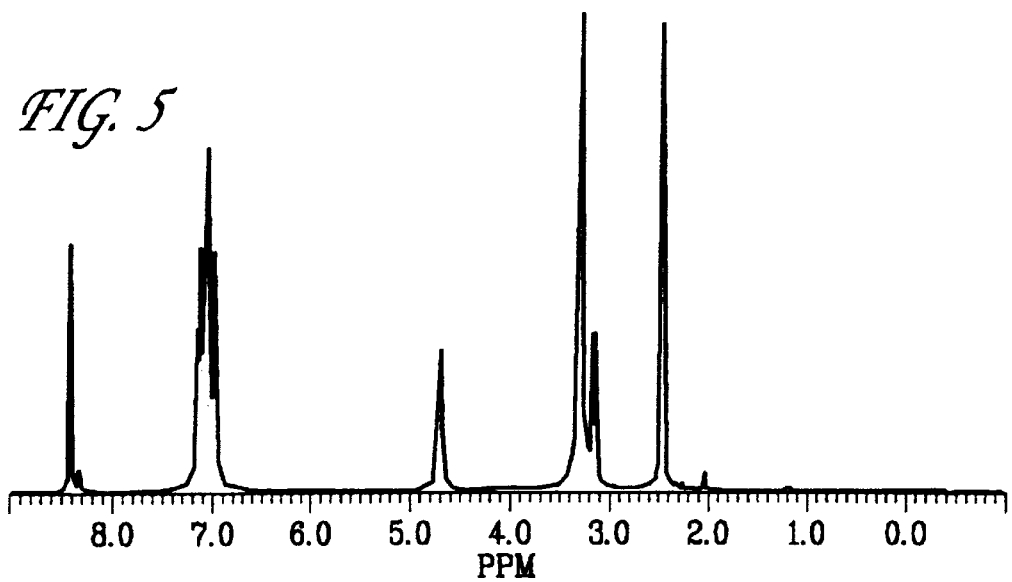
359.88 MHz $^1$H NMR of bisdiphenylglycoluril solution containing $^{13}$C labeled methane and $CO_2$
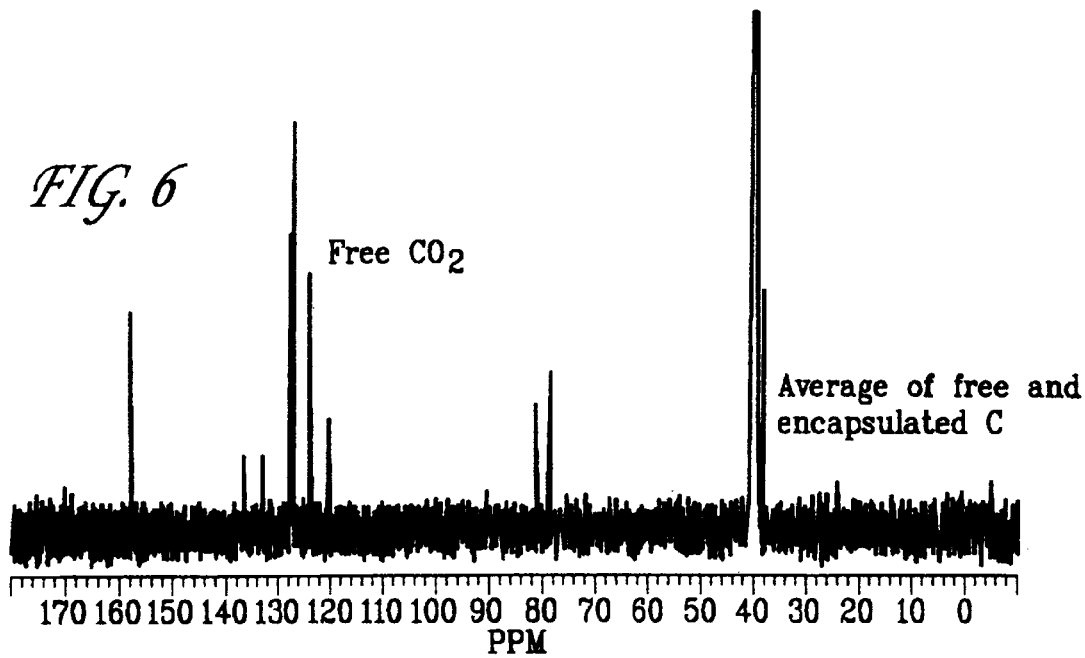
125.77 MHz $^{13}$C NMR of bisdiphenylglycoluril solution containing $^{13}$C labeled methane and $CO_2$

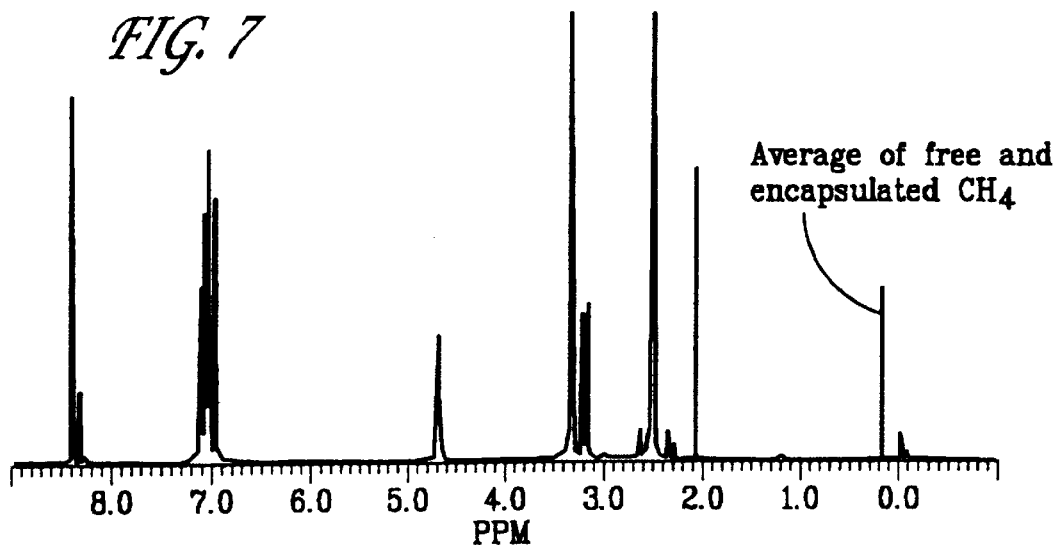
359.88 MHz $^1$H NMR of bisdiphenylglycoluril solution which has been exposed to a 50/50 mixture of methane and $CO_2$
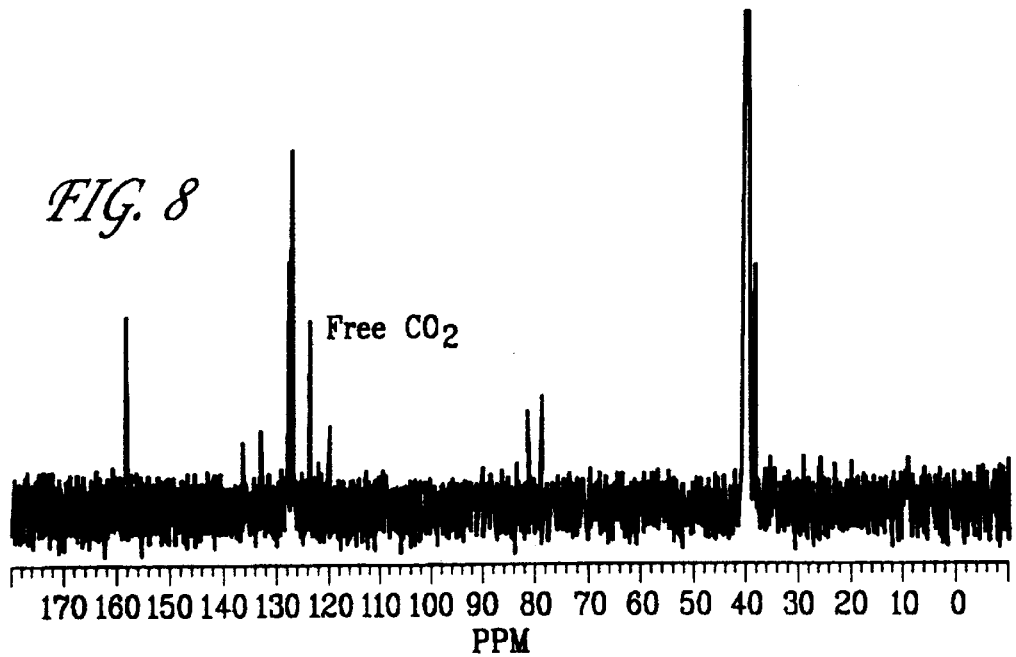
125.77 MHz $^{13}$C NMR of bisdiphenylglycoluril solution which has been exposed to a 50/50 mixture of methane and $CO_2$

METHOD FOR SEPARATING METHANE FROM NATURAL GAS USING BISGLYCOLURIL DERIVATIVES

FIELD OF THE INVENTION

This invention relates to a method for separating components of gas mixtures, and more particularly, to a method for selectively recovering methane in the presence of carbon dioxide.

BACKGROUND OF THE INVENTION

The recovery of methane from carbon dioxide-rich natural gas reserves is a technical and economic challenge. Some reservoirs around the world may contain up to about 90% carbon dioxide. Generally, carbon dioxide must be separated from the natural gas stream because carbon dioxide contains no thermal heating value and has acidic properties which can corrode natural gas equipment.

There are numerous methods available for removing carbon dioxide from natural gas streams. Most commonly used are processes that operate through removal of carbon dioxide by chemical absorption/desorption, or cryogenic fractionation, both of which are capital and energy intensive for dilute streams. Natural gas is treated in very high volumes making even slight differences in the capital or operating cost of treatment systems significant factors in selecting a process technology.

The chemical absorption process utilizes a chemical solvent such as ethanolamine to chemically bind the carbon dioxide for removal. This generally occurs by passing the unpurified natural gas stream through a packed or trayed tower in which the chemical solvent is flowing countercurrently to the natural gas stream. The chemical solvent will bind and remove the carbon dioxide and a purified natural gas stream emerges from the top of the tower.

The chemical solvent, which is then rich in carbon dioxide, must be regenerated so that the solvent can be reused or recycled. This typically occurs by lowering the pressure and raising the temperature of the carbon dioxide rich solvent stream in a regeneration tower. This tower generally consists of a reboiler and a reflux condensing system. Heat is added in the reboiler to break the carbon dioxide-solvent bonds and the reflux system condenses any solvent vapors that might escape with the carbon dioxide gas. The purified carbon dioxide emerges from the top of the tower at a pressure substantially lower than the original natural gas stream.

Cryogenic processing is a physical process in which subambient temperatures are employed to bring about a separation between different components in a gas mixture. Cryogenic plants are not used very widely because they are expensive and complicated. A particular complication is the need for significant pretreatment to remove water vapor and heavy hydrocarbons and aromatics to avoid the freezing of these components in the cryogenic section of the plant, which typically operates at temperatures down to −150° C. The degree of pretreatment is usually far more elaborate and the demands placed upon it far more stringent than would be required to render the gas acceptable in a pipeline grid.

The methods described above and all those known to Applicants generally involve the removal of carbon dioxide from natural gas streams that are fairly rich in methane. For dilute gas streams, i.e. those comprising less than about 50% methane, these processes generally are inefficient. Accordingly, there remains a need for a more efficient and cost effective means of methane recovery from fields of carbon dioxide-rich natural gas reserves, which historically have presented an economic and technical challenge.

SUMMARY OF THE INVENTION

The present invention provides a method for selectively recovering methane from a gas stream comprising carbon dioxide. The invention uses a bisglycoluril derivative to selectively extract methane in the presence of carbon dioxide. The present method provides an efficient and economic means for the recovery of methane, particularly when applied to dilute gas streams comprising relatively high amounts of carbon dioxide, such as more than about 50% carbon dioxide.

The selectivity of the bisglycoluril derivative for methane over carbon dioxide has not heretofore been known or utilized. For natural gas processing, the method of the present invention is unusual in that all other known processes selectively remove carbon dioxide, usually the minor component of the gas stream.

BRIEF DESCRIPTION OF THE DRAWINGS

FIGS. 1–8 are $^1$H and $^{13}$C NMR spectra used to illustrate the selective extraction mechanism of the present invention.

DETAILED DESCRIPTION OF THE INVENTION

Figure 9:
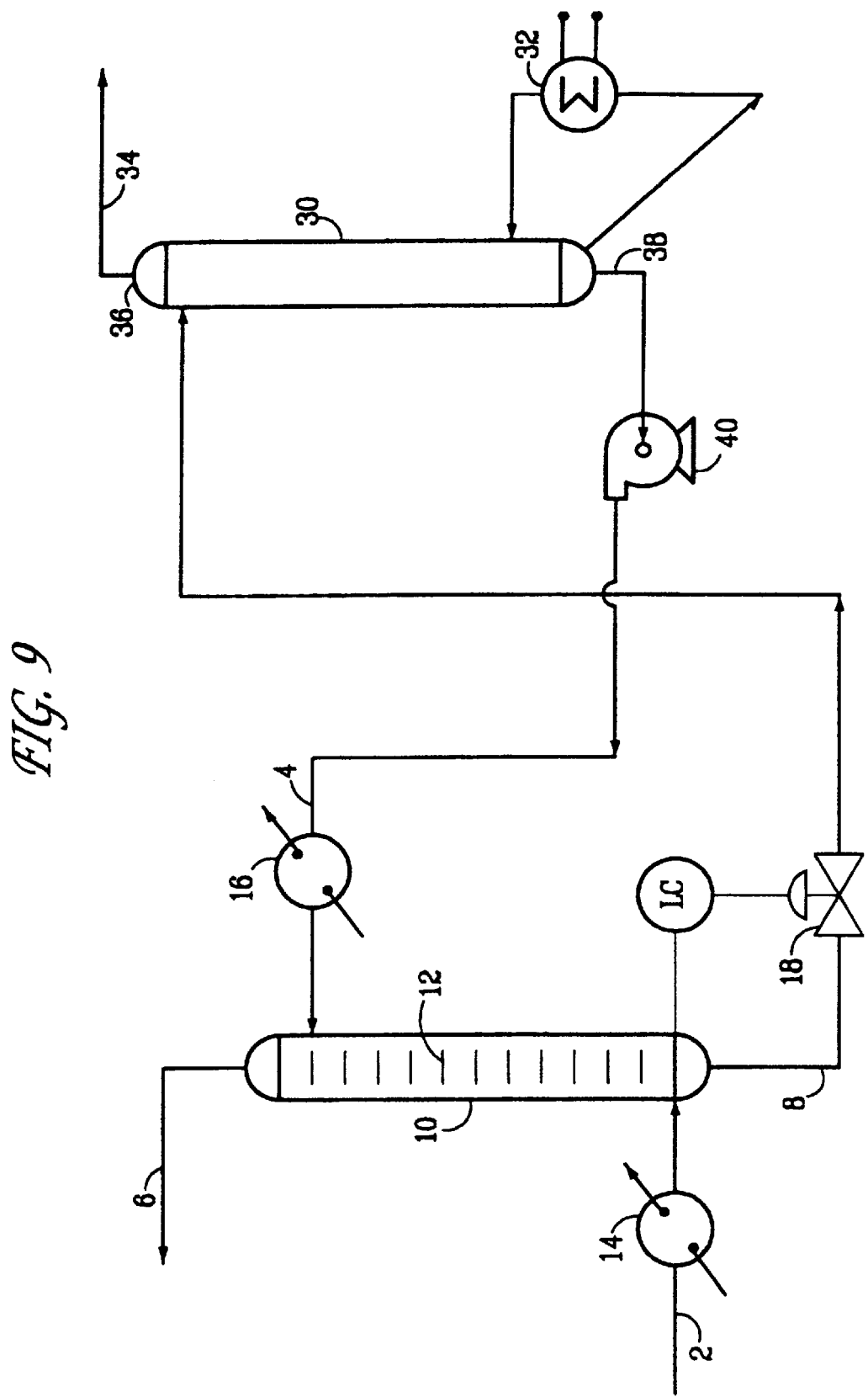
FIG. 9 is a process flow diagram of an embodiment of the process used to separate methane from a gas stream comprising methane and carbon dioxide.

The present invention relates to a bisglycoluril derivative that can be used in a separation process for treating a gas stream comprising methane and carbon dioxide. The invention involves contacting a gas stream containing these components with the bisglycoluril derivative which selectively extracts methane in the presence of carbon dioxide. The term "selectively" or "selectivity" as used herein refers to the difference in the amount of one gas extracted relative to another gas in the same mixture. The bisglycoluril derivative is generally contained in a liquid, forming a solution or suspension, and temperature and pressure are controlled to attain conditions around which extraction of methane takes place.

The method of the present invention is useful for treating any gas stream that contains methane and carbon dioxide, either as a two-component mixture, or in admixture with other gases or vapors. The gas stream may contain methane and carbon dioxide in any proportions. Generally, the method of the present invention can be used to treat gas streams comprising from about 40 to about 90% carbon dioxide, and preferably from about 50 to about 80% carbon dioxide. If the stream is natural gas, other constituents besides methane and carbon dioxide may be present depending on the source of the natural gas. These constituents include other hydrocarbons, such as ethane, propane, butane, nitrogen, water vapor, hydrogen sulfide, and helium.

The amount of carbon dioxide that is acceptable in the methane product stream depends on the destination of the methane. Natural gas pipeline specifications generally call for no more than about 30% inerts, so depending on the other constituents, this means no more than about 30% carbon dioxide. If purer methane is required, the acceptable carbon dioxide content may obviously be lower.

The separation process of the present invention involves a bisglycoluril derivative that selectively extracts methane in the presence of carbon dioxide and has the following chemical structure hereinafter referred to as "formula (I)":

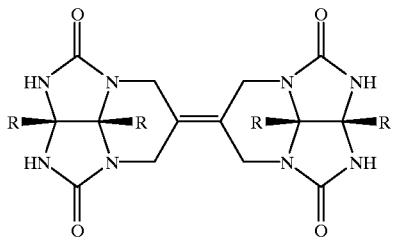

wherein each R substituent is, independently, phenyl, substituted phenyl, amine, N-substituted amine, carboxy, aldehyde, hydroxy, hydrogen, or carboalkoxy. It is to be understood that each R substituent may be the same or different from the other. Preferably, R is phenyl or substituted phenyl, wherein the compound is referred to as bis-diphenylglycoluril.

It is believed that the extraction involves the formation of a complex between the compounds of methane in the gas stream and the compounds of formula (I). Although not intending to be limited by any one theory, it is believed that the compounds of formula (I) may undergo reversible dimerization to form a dimer (hereafter "the dimer") which is believed to define a closed-shell cavity capable of enclosing methane and excluding carbon dioxide. Formula (I) represents a monomer or single compound and represents a sub-unit or one-half of the dimer. The term "dimeric compound" or "dimer" as used herein refers to a compound formed by the union of at least two compounds, i.e. two compounds of formula (I).

Although the exact mechanism by which the bisglycoluril derivative of the present invention extracts methane is not clear, herein that mechanism will be referred to as encapsulation. It is believed that an array of hydrogen bonding sites along the periphery of the monomers may hold the dimeric forms together along a seam of a roughly spherical structure, referred to as the "Rebek tennis ball assembly" (see references listed below). The resulting dimers feature internal cavities for guests of appropriate sizes and shapes, and the encapsulated guests may be directly observed by NMR spectroscopy.

Other self-assembling bisglycoluril derivatives have been described in the literature. See, e.g., Wyler, R.; de Mendoza, J.; and Rebek Jr., J., Angew. Chem. Int. Ed. Engl., 1699, Vol. 32, No. 12 (1993); Branda, N.; Wyler, R.; Rebek Jr., J., Science, 1267, Vol. 263 (1994); Valdes, C.; Toledo, L. M.; Spitz, U.; Rebek Jr., J., Chem. Eur. J., 989, Vol. 2, No. 8 (1996), each of the disclosures of which are incorporated herein by reference in their entirety. In particular, the literature has disclosed bisglycoluril derivatives demonstrating selectivity between methane and ethane (see e.g., Valdes at pages 989 et seq.). However, it has now been discovered that the bisglycoluril derivative of the present invention selectively encapsulates methane in the presence of carbon dioxide.

It is believed that the inner capacity of the dimer formed by the bisglycoluril derivative is determined by the dimensions of the spacer between the glycoluril subunits (e.g. ethylidene in formula (I)), the conformations of the neighboring rings, and the geometry of the hydrogen bonds. As used herein, "inner capacity" refers to the volume of the enclosed space defined by the dimer. In the present method, the preferred spacer group is ethylidene. It is believed that the ability of the dimer to encapsulate guest molecules is dictated by internal geometry, requiring guests of complementary shape and symmetry.

The process of the present invention involves the contacting of the bisglycoluril derivative of formula (I) with a gas stream comprising methane and carbon dioxide. The present method may include liquid-gas or solid-gas contacting. Preferably, the compound of formula (I) is in solution, and may be used in any known gas-liquid contacting operation for separating components of a gas mixture.

Generally, a gas mixture is contacted with a liquid for the purpose of preferentially dissolving one or more components of the gas and to provide a solution of these in the liquid. In the preferred embodiments of the present invention, the bisglycoluril derivative of formula (I) is dissolved in a liquid solvent which is preferably an organic solvent. The R group of formula (I) is believed to affect the solubility of the bisglycoluril derivative in various solvents, and the solvent used may depend on the R groups selected. The solvent is preferably substantially non-polar in order not to interfere with the hydrogen bonding of the dimer, and the dimensions of the solvent molecules are preferably larger than the inner capacity of the dimer. Solvents that may be used in accordance with the present process include water, dimethyl sulfoxide, dimethyl formamide, sulfolane, glycol derivatives, hydrocarbons, halogenated hydrocarbons, and oxygenated hydrocarbons.

The temperature and pressure are controlled to attain conditions around which the gas dissolves in the solvent and around which monomers of formula (I) assemble into dimers and selectively encapsulate methane in the presence of carbon dioxide. The optimal temperature and pressure will change with several variables including the composition of the gas and the composition of the solvent.

The liquid-gas contacting process can be carried out by any known technique in the art. For example, the liquid-gas contacting technique may include countercurrent extraction, bubble gas/stationary liquid extraction, adsorption, pressure swing adsorption, and temperature swing adsorption. For purposes of illustrating a basic embodiment, reference is made to the schematic flow diagram of FIG. 9. The method of the present invention can be described by featuring two main vessels, a high pressure absorbing column 10 and a high pressure regeneration column 30.

In the high pressure absorbing column 10, the gas feed stream 2 is contacted with the liquid stream 4 containing compounds of the bisglycoluril derivative of formula (I). The temperature and pressure in the high pressure absorbing column 10 are controlled to attain conditions around which the dimer forms and encapsulates methane in the liquid phase. The liquid stream 4 will typically comprise compounds of formula (I) dissolved in a suitable solvent.

The pressure to be maintained in the high pressure absorber column 10 can vary with the pressure of the available gas feed stream 2. This pressure will typically be between about 0 and about 2000 psig for gas feed streams 2 which come directly from gas production facilities.

The temperature in the high pressure absorption column 10 should be controlled at the point where the dimer forms and encapsulates methane at the given pressure. The temperature in the high pressure absorption column will typically be controlled by temperature control systems known in the art. For example, the gas feed stream 2 may be cooled with a gas feed refrigeration chiller 14 and the liquid feed stream 4 may be cooled with a liquid feed refrigeration chiller 16. The high pressure absorbing column 10 generally contains trays 12 to enhance contact between the feed gas 2 and the liquid 4. Alternatively, the column may contain a packing medium or other means of enhancing gas-liquid contact.

The bottoms stream 8 from the high pressure absorbing column 10 contains the dimer which has selectively encapsulated the methane molecules. The carbon-dioxide enriched stream 6 exits the column as a gas above the trays 12.

The bottoms stream 8 can be regenerated to recover the encapsulated methane. This recovery may be accomplished by the addition of heat to the bottoms stream 8 and/or by a reduction in pressure on the bottoms stream 8 either of which will cause the dimeric structures to decompose and thereby release the methane molecules trapped inside.

For example, the regeneration system shown in the embodiment of FIG. 9 may use the addition of heat along with a slight pressure reduction as the means of regeneration. The bottoms stream 8 is fed into a high pressure regeneration column 30. The pressure on the high pressure regeneration column is maintained slightly below the pressure at which the high pressure absorbing column 10 is maintained. The pressure differential should be enough to push the bottoms stream 8 into the high pressure regeneration column 30 without requiring a mechanical pumping device 18. Alternatively, the high pressure regeneration column 30 could be run at a pressure higher than the high pressure absorbing column 10. This alternative would require pumping the bottoms stream 8 into the high pressure regeneration column 30.

The temperature on the high pressure regeneration column 30 is maintained above the formation point of the dimer. This change in conditions causes the dimeric structures to dissociate into monomer, releasing encapsulated methane. Heat is added to the high pressure regeneration column 30 by means of a heat exchanger 32 on the bottom of the column. Other means of heating this column are acceptable.

The methane rich exit stream 34 leaves the high pressure regeneration column through a vent 36 at the top of the column. The regenerated liquid 38 containing the compounds of formula (I) is pumped from the bottom of the high pressure regeneration column 30 by means of a mechanical pump 40 and returned for use in the high pressure absorbing column 10.

Alternate embodiments include the use of the bisglycoluril derivative of formula (I) in solid-state systems. For example, the compounds of formula (I) may be supported in mesoporous solids such as MCM-41 (see C. T. Kresge, et al., *Nature*, 359, 710 (1992) for a description of MCM-41).

Depending on the components in the gas mixture, the dimer may encapsulate small molecules in addition to methane. In this case, further treatment may be necessary to separate the methane. The gas streams to which the invention is applied may be subjected to any known treatments upstream or downstream of the present methane encapsulation process for purposes of removing other constituents. The present methane encapsulation process may be augmented by other carbon dioxide/methane separation techniques. Such treatments and techniques include, but are not limited to, membrane separations, condensation, absorption, adsorption, distillation, and cryogenic fractionation. For example, it may be desirable to pre-treat a gas stream prior to contacting with the bisglycoluril derivative of formula (I) to provide a stream consisting substantially of methane and carbon dioxide. Any appropriate equipment can be used for these supplementary separations, such as absorption units, including towers or columns containing liquid absorbents; adsorption units, including molecular sieves; condensation units, relying on chilling, compression or both to liquify a portion of the gas stream; and membrane units, including those containing membranes selectively permeable to carbon dioxide, nitrogen, or other constituents of the gas.

Many ways to make use of the method of the present invention as a stand-alone operation or to incorporate it into other separation and treatment schemes will suggest themselves to those skilled in the art based upon the teachings given herein. The invention is now further illustrated by the following examples which are not intended to limit the scope or underlying principles of the present invention in any way.

EXAMPLE 1

A preferred bisglycoluril derivative (bisdiphenylglycoluril) was prepared in three steps as follows:

(i) Diphenylglycoluril synthesis: Urea (60 g), benzil (105.2 g), trifluoracetic acid (50 ml), and benzene (1000 ml) were refluxed in a Dean-Stark apparatus until water production ceased (12 hr). The product was filtered off as crystals, and washed with ethanol.

(ii) Tetrakis (bromomethyl) ethylene (TBME) synthesis: To pinacolyl alcohol (12.6 ml) and concentrated HBr (1 ml) was added bromine (40 ml) dropwise under reflux. The temperature was held at 40–50° C. for 8 hr, at 20° C. overnight, and again at 50° C. for 2 hr. The red solid product was broken up in the presence of light petroleum naphtha, and excess bromine was neutralized by adding solid sodium bisulfite and cracked ice. Water was finally added, and crude TBME was filtered off as pale yellow crystals. The product was recrystallized from ethyl acetate.

(iii) Bisdiphenylglycoluril syntheses: A mixture of diphenylglycoluril (1332 g), finely powdered KOH (50 g), and dimethyl sulfoxide (DMSO) (1250 ml) was rapidly heated to 120° C. with vigorous stirring. TBME (9 g) was added and stirring continued 1 hr. The reaction mixture was poured into 15L of water, the precipitate was filtered and washed thoroughly with water. The crude residue was soxhlet-extracted with $CH_2Cl_2$. The combined extracts were evaporated to dryness to yield bisdiphenylglycoluril.

EXAMPLE 2

359.88 MHZ $^1$H and 125.77 MHZ $^{13}$C solution NMR spectra were obtained for the pure compound on a Bruker 500 MHZ AMX spectrometer using a 0.8 wt % solution of the bisdiphenylglycoluril in DMSO. $^1$H NMR chemical shifts were δ8.40(s, 4H, NH), δ7.06(m, 20H, phenyl), δ4.70 (d, 4H, J=15.6 Hz), and δ3.19(d, 4H, J=15.6Hz), see FIG. 1. $^{13}$C NMR chemical shifts were 158.5, 136.9, 133.3, 128.1, 128.0, 127.9, 127.2, 127.1, 120.3, 81.3, 78.4, 37.9, see FIG. 2.

EXAMPLE 3

99.9% pure $^{13}$C labeled methane was bubbled for 10 minutes through a 0.8 wt % solution of the bisdiphenylglycoluril in DMSO. Two peaks not due to the bisdiphenylglycoluril were observed in the 359.88 MHZ $^1$H NMR spectrum, see FIG. 3, at 0.33 ppm and 0.07 ppm that are thought to be due to the free methane in solution and the methane encapsulated into bisdiphenylglycoluril, respectively. Only one peak that was not due to bisdiphenylglycoluril was observed in the 125.77 MHZ $^{13}$C NMR spectrum, see FIG. 4, at −3.8 ppm. This peak is believed to be due to the average of the free methane in solution and the methane encapsulated into bisdiphenylglycoluril. The literature reported $^{13}$C chemical shift for free methane in solution is −2.1 ppm (See, Spiesecke, H. and Schneider, W. G., *J. Chem. Phys.*, 722, vol. 35 (1961).

EXAMPLE 4

$CO_2$ was bubbled for 10 minutes through the above solution in example 3. No additional peaks were observed in the 359.88 MHZ $^1$H NMR spectrum, see FIG. 5, for this solution. One additional peak was observed in the 125.77 MHZ $^{13}$C NMR spectrum, see FIG. 6, at 124.1 ppm. The literature reported $^{13}$C NMR chemical shift for free $CO_2$ in solution is 124.2 ppm (See, Ettinger, R., Blume, P., Patterson Jr., A, and Lauterbur, P. C., *J. Chem. Phys.*, 1597, Vol. 33 (1960).

EXAMPLE 5

A 50/50 mixture of methane and carbon dioxide was bubbled for 20 minutes through a 0.8 wt % DMSO solution of the bisdiphenylglycoluril. Only one peak not due to the bisdiphenylglycoluril was observed in the 359.88 MHZ $^1$H NMR spectrum, see FIG. 7, at 0.2 ppm that is thought to be due to an average between the free methane in solution and the methane encapsulated into bisdiphenylglycoluril. Only one peak that was not due to bisdiphenylglycoluril was observed in the 125.77 MHZ $^{13}$C NMR spectrum, see FIG. 8, at 124.1 ppm. This peak is believed to be due to free $CO_2$ in solution (See, Ettinger, R., Blume, P., Patterson Jr., A, and Lauterbur, P. C., *J. Chem. Phys.*, 1597, Vol. 33 (1960).

What is claimed is:

1. A method for separating methane from a gas stream comprising methane and carbon dioxide, said method comprising:

contacting said gas stream with a compound to provide a complex of said methane and said compound, wherein said compound has the formula (I):

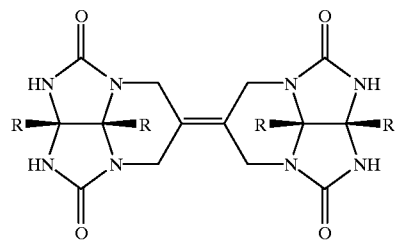

wherein each R, independently, is selected from the group consisting of phenyl, substituted phenyl, amine, N-substituted amine, carboxy, aldehyde, hydroxy, hydrogen, and carboalkoxy; and isolating said complex of said methane and said compound from said gas stream.

2. The method of claim 1, wherein said methane is separated from said complex of said methane and said compound.

3. The method of claim 1 wherein R is phenyl.

4. The method of claim 1, wherein said gas stream comprises from about 40 to about 90% carbon dioxide.

5. The method of claim 1 wherein said compound is dissolved in an organic solvent.

6. The method of claim 1 wherein said compound is dissolved in a solvent selected from the group consisting of water, dimethyl sulfoxide, dimethyl formamide, sulfolane, glycol derivatives, hydrocarbons, halogenated hydrocarbons, and oxygenated hydrocarbons.

7. The method of claim 1, wherein said complex comprises a spherical dimer formed by two compounds of formula (I).

8. The method of claim 7, wherein said methane is enclosed within said dimer.

* * * * *